United States Patent
Chang

(10) Patent No.: US 7,859,755 B2
(45) Date of Patent: Dec. 28, 2010

(54) LENS MODULE AND METHOD FOR FABRICATING SAME

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 254 days.

(21) Appl. No.: 12/327,578

(22) Filed: Dec. 3, 2008

(65) Prior Publication Data

US 2009/0257135 A1    Oct. 15, 2009

(30) Foreign Application Priority Data

Apr. 9, 2008   (CN) ................. 2008 1 0300932

(51) Int. Cl.
   *G02B 27/10*   (2006.01)
   *G03B 21/56*   (2006.01)
   *G03B 21/60*   (2006.01)
   *B29D 11/00*   (2006.01)

(52) U.S. Cl. ................. 359/618; 359/443; 359/454; 264/1.32

(58) Field of Classification Search ......... 359/618–622, 359/625–626, 443, 454–455; 264/1.1, 1.32, 264/2.7

See application file for complete search history.

(56) References Cited

U.S. PATENT DOCUMENTS

2010/0053601 A1* 3/2010 Osawa et al. ............. 356/124.5
2010/0142061 A1* 6/2010 Choi et al. ................. 359/793

* cited by examiner

*Primary Examiner*—Scott J Sugarman
*Assistant Examiner*—Dawayne A Pinkney
(74) *Attorney, Agent, or Firm*—Clifford O. Chi

(57) ABSTRACT

A lens module includes: a base unit, a first lens unit, a spacer unit, a second lens unit and a cap unit. The base unit has a first through hole having a first tapered portion. The first lens unit has a first peripheral portion having second and third tapered portions. The second and third tapered portions taper in opposite directions. The second tapered portion is engaged in the first tapered portion of the first through hole of the base unit. The spacer unit has a second through hole having fourth and fifth tapered portions. The fourth and fifth tapered portions taper in opposite directions. The fourth tapered portion is engaged in the third tapered portion. The second lens unit has a second peripheral portion having a sixth tapered portion. The sixth tapered portion is engaged in the fifth tapered portion of the second through hole of the spacer unit.

10 Claims, 3 Drawing Sheets

LENS MODULE AND METHOD FOR FABRICATING SAME

BACKGROUND

1. Technical Field

The present invention relates to lens modules, and to a method for fabricating a plurality of lens modules.

2. Description of Related Art

Lens modules are key components of cameras, including still cameras and digital cameras. A typical lens module usually includes a plurality of lenses and a plurality spacers located between the lenses.

Injection molding is widely used for making the lenses, the spacers and even bases or holders for the lenses and the spacers. Generally, the lenses and the spacers first are made one by one, and then are assembled together to fabricating a lens module.

However, with the above method, a high efficiency for fabricating a plurality of the lens modules cannot be achieved.

What is needed, therefore, is a lens module and a method for fabricating a plurality of the lens modules, which can overcome the above shortcomings.

SUMMARY

An exemplary lens module includes: a base unit, a first lens unit, a spacer unit, a second lens unit and a cap unit. The base unit has a first through hole therein. The first through hole has a first tapered portion. The first lens unit has a first central optical portion and a first peripheral portion surrounding the first central optical portion. The first peripheral portion has a second tapered portion and a third tapered portion at opposite sides thereof. The second and third tapered portions taper in opposite directions. The second tapered portion is engaged in the first tapered portion of the first through hole of the base unit. The spacer unit has a second through hole therein. The second through hole has a fourth tapered portion and a fifth tapered portion at opposite sides thereof. The fourth and fifth tapered portions taper in opposite directions. The fourth tapered portion is engaged in the third tapered portion of the first lens unit. The second lens unit has a second central optical portion and a second peripheral portion surrounding the second central optical portion. The second peripheral portion has a sixth tapered portion. The sixth tapered portion is engaged in the fifth tapered portion of the second through hole of the spacer unit. The cap unit has a light incident opening. The cap unit is engaged with the second lens unit.

Other advantages and novel features of the lens module and the method will become more apparent from the following detailed description of embodiment when taken in conjunction with the accompanying drawings.

BRIEF DESCRIPTION OF THE DRAWINGS

Many aspects of present lens module and method can be better understood with reference to the following drawings. The components in the drawings are not necessarily drawn to scale, the emphasis instead being placed upon clearly illustrating the principles of the present lens module and method. Moreover, in the drawings, like reference numerals designate corresponding parts throughout the several views.

DETAILED DESCRIPTION OF THE EMBODIMENT

Embodiment of present lens module and method will now be described in detail below and with reference to the drawings.

Figure 1:
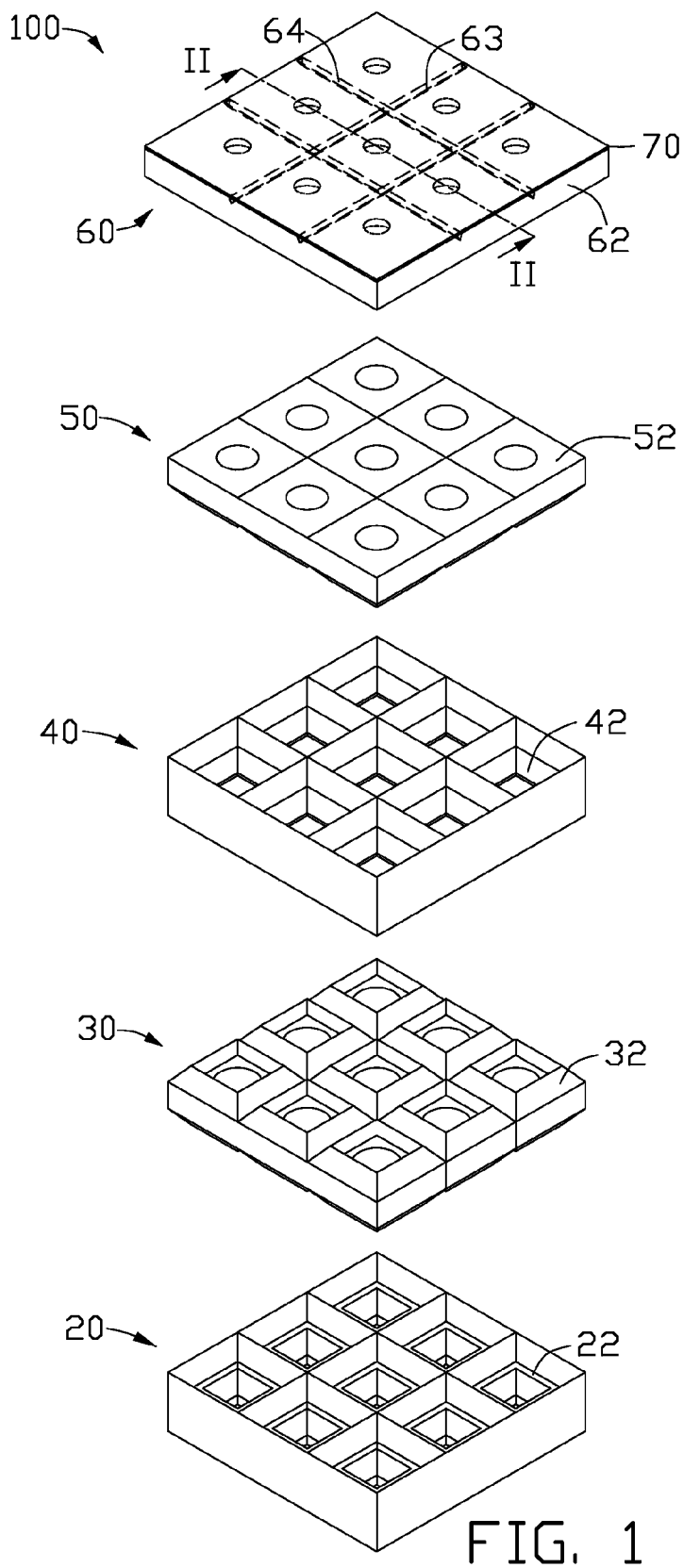
FIG. 1 is a schematic view of a base preform, a first lens preform, a spacer preform, a second lens preform, a cap preform in accordance with an exemplary embodiment, the cap preform having a protecting film covered thereon.
Figure 2:
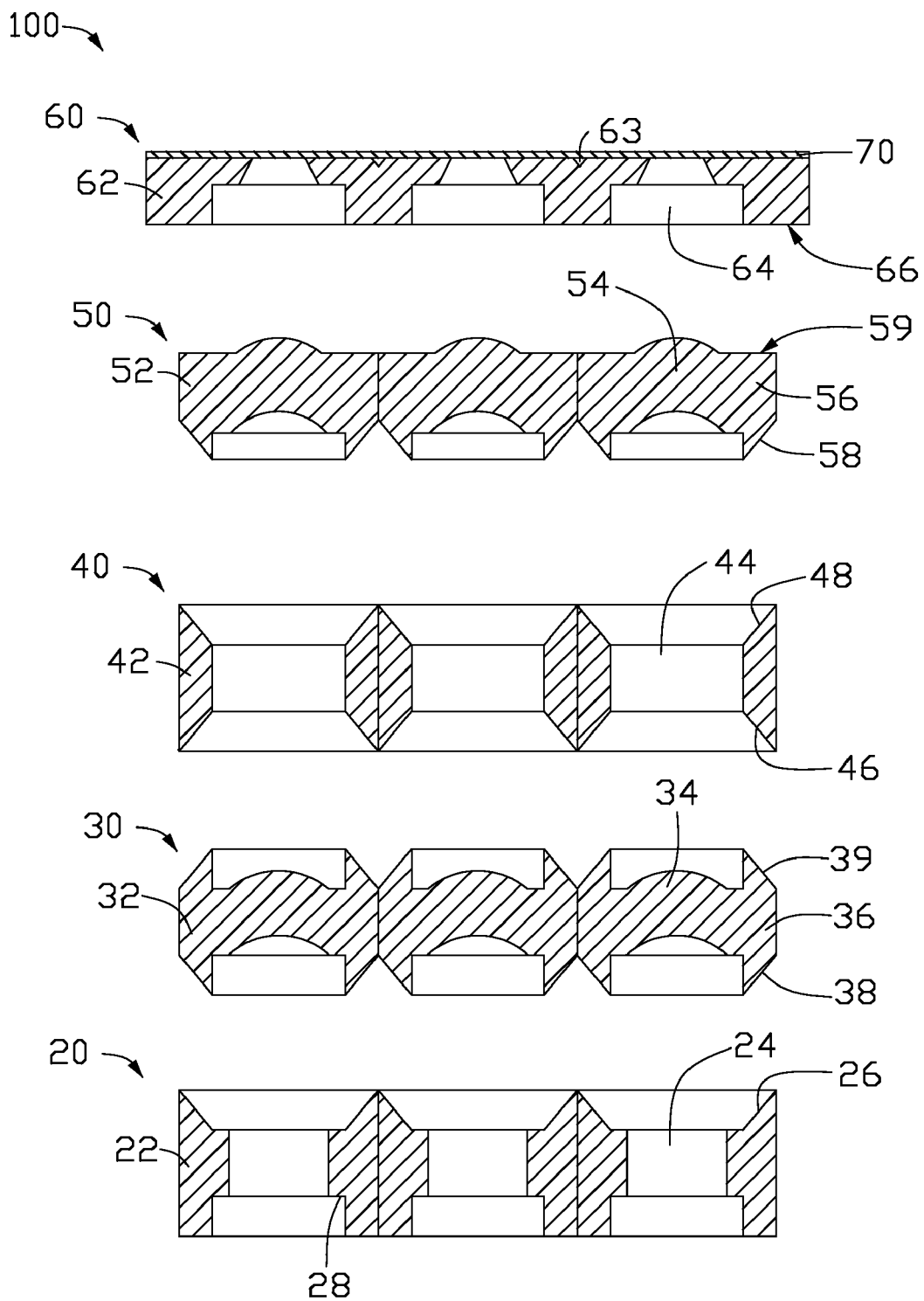
FIG. 2 is a cut-away view of the base preform, the first lens preform, the spacer preform, the second lens preform, the cap preform and the protecting film taken along line II-II of FIG. 1.
Figure 3:
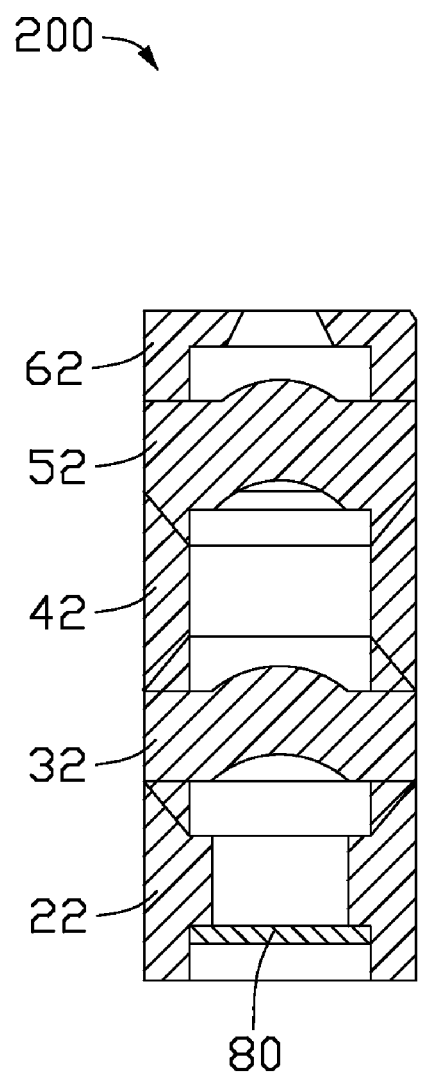
FIG. 3 is a cut-away view of a lens module including a base unit, a first lens unit, a spacer unit, a second lens unit and a cap unit.

Referring to FIGS. 1 to 3, a lens module 200 and a method 100 for fabricating a plurality of the lens modules 200 are provided.

The lens module 200 (see FIG. 3) includes a base unit 22, a first lens unit 32, a spacer unit 42, a second lens unit 52, a cap unit 62 and an IR-cut filter 80.

The base unit 22 has a first through hole 24 therein. The first through hole 24 has a first tapered portion 26 and a step portion 28 at opposite ends thereof. The first tapered portion 26 tapers toward a center of the first through hole 24. The IR-cut filter 80 is received in the step portion 28.

The first lens unit 32 has a first central optical portion 34 and a first peripheral portion 36 surrounding the first central optical portion 34. The first central optical portion 34 may be spherical shaped or aspherical shaped. The first peripheral portion 36 has a second tapered portion 38 and a third tapered portion 39 formed at opposite surfaces of the first peripheral portion 36. The second and third tapered portions 38, 39 taper in opposite directions. The second and third tapered portions 38, 39 taper toward a periphery of the first peripheral portion 36. The second tapered portion 38 is engaged in the first tapered portion 26 of the first through hole 24 of the base unit 22.

The spacer unit 42 has a second through hole 44 therein. The second through hole 44 has a fourth tapered portion 46 and a fifth tapered portion 48 formed at opposite ends of the second through hole 44. The fourth and fifth tapered portions 38, 39 taper in opposite directions. The fourth tapered portion 46 is engaged in the third tapered portion 39 of the first lens unit 32.

The second lens unit 52 has a second central optical portion 54 and a peripheral portion 56 surrounding the second central optical portion 54. The second central optical portion 54 may be spherical shaped or aspherical shaped. The peripheral portion 56 has a sixth tapered portion 58 tapered toward a periphery of the peripheral portion 56. The sixth tapered portion 58 is engaged in the fifth tapered portion 48 of the second through hole 44 of the spacer unit 42. The peripheral portion 56 has a flat surface 59 facing the cap unit 62.

The cap unit 62 has a step-shaped light incident opening 64 therein. The cap unit 62 has a second flat surface 66 facing the second lens unit 52. The second flat surface 66 is engaged with the first flat surface 59 of the second lens unit 52, and part of the second lens unit 52 is received in the light incident opening 64.

The first lens unit 32 can be steadily retained by the base unit 22 due to the second and first tapered portions 38, 26. The spacer unit 42 can be tightly engaged with the first lens unit 32 by the fourth and third tapered portion 46, 39. The second lens unit 52 can be steadily retained by the spacer unit 42 due to the sixth and fifth tapered portion 58, 48. A glue may be applied between the tapered portions of the base unit 22, the first lens unit 32, the spacer unit 42 and the second lens unit 52, and be applied between the flat surfaces of the second lens unit 52 and the cap unit 62.

A plurality of the lens modules 200 may be fabricated by the method 100. The method 100 mainly includes steps of:

providing a base preform 20, the base preform 20 including an array of the base units 22;

providing a first lens preform 30, the first lens preform 30 including an array of the first lens units 32.

providing a spacer unit preform 40, the spacer unit preform 40 including an array of the spacer units 42;

providing a second lens preform 50, the second lens preform 50 including an array of the second lens units 52;

providing a cap preform 60, the cap preform 60 including an array of the cap units 62;

stacking the base preform 20, the first lens preform 30, the spacer unit preform 40, and the second lens preform 50, one on another each other;

mounting the cap preform 60 on the second lens preform 50, thereby forming a lens module a lens module perform (not shown) including an array of lens modules each having one of the base units 22, one of the first lens units 32, one of the spacer units 42, one of the second lens units 52 and one of the cap units 62; and dicing the lens module preform into a plurality of the lens modules 200.

A plurality of lines (not labeled) are formed on the base preform 20, the first lens preform 30, the spacer preform 40, the second lens preform 50 and the cap preform 60, so as to facilitate dicing the lens module preform into a plurality of the lens modules 200. The lines of on the cap preform 60 are V-cut grooves 63, 64.

During the stacking step and the mounting step, a glue may be applied between the tapered portions of the base unit 22, the first lens unit 32, the spacer unit 42 and the second lens unit 52, and be applied between the flat surfaces of the second lens unit 52 and the cap unit 62.

Prior to the dicing step, a transparent protecting film 70 may be applied on the cap preform 60 to protect the lens module array from pollution and unintentional damages during the dicing step. The transparent protecting film 70 may be removed when the dicing step is finished. After the dicing step, the IR cut filters 80 may be applied on the step portion 28 of each of the base units 22.

By this method 100, a plurality of the lens modules 200 are fabricated at a same time, such that a high efficiency can be achieved.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A lens module, comprising:

a base unit having a first through hole therein, the first through hole having a first tapered portion;

a first lens unit having a first central optical portion and a first peripheral portion surrounding the first central optical portion, the first peripheral portion having a second tapered portion and a third tapered portion at opposite sides thereof, the second and third tapered portions tapering in opposite directions, the second tapered portion engaged in the first tapered portion of the first through hole of the base unit;

a spacer unit having a second through hole therein, the second through hole having a fourth tapered portion and a fifth tapered portion at opposite sides thereof, the fourth and fifth tapered portions tapering in opposite directions, the fourth tapered portion of the second through hole engaged with the third tapered portion of the first lens unit;

a second lens unit having a second central optical portion and a second peripheral portion surrounding the second central optical portion, the second peripheral portion having a sixth tapered portion, the sixth tapered portion engaged in the fifth tapered portion of the second through hole of the spacer unit; and a cap unit having a light incident opening, the cap unit engaged with the second lens unit.

2. The lens module of claim 1, wherein the second peripheral portion of the second lens unit has a first flat surface facing the cap unit, and the cap unit has a second flat surface facing the first flat surface of the second lens unit.

3. The lens module of claim 1, wherein the base unit has a step portion in the first through hole.

4. The lens module of claim 3, further comprising an IR-cut filter mounted on the step portion in the first through hole of the base unit.

5. A method for fabricating a plurality of lens modules, comprising:

providing a base preform comprising an array of base units, each of the base units having a first through hole therein, the first through hole having a first tapered portion;

providing a first preform comprising an array of first lens units, each of the first lens units having a first central optical portion and a first peripheral portion surrounding the first central optical portion, the first peripheral portion having a second tapered portion and a third tapered portion at opposite sides thereof, the second and third tapered portions tapering in opposite directions;

providing a spacer preform comprising an array of spacer units, each of the spacer units having a second through hole therein, the second through hole having a fourth tapered portion and a fifth tapered portion at opposite sides thereof, the fourth and fifth tapered portions tapering in opposite directions;

providing a second lens preform comprising an array of second lens units, each of the second lens units having a second central optical portion and a second peripheral portion, the second peripheral portion having a sixth tapered portion;

providing a cap preform comprising an array of cap units, each of the cap units having a light incident opening;

stacking the base preform, the first lens preform, the spacer preform, and the second lens preform, one on another each other;

mounting the cap preform on the second lens preform, thereby forming a lens module preform including an array of lens modules each having one base unit, one first lens unit, one spacer unit, one second lens unit and one cap unit; and dicing the lens module preform into a plurality of the lens modules.

6. The method of claim 5, wherein the second peripheral portion of the second lens unit has a first flat surface facing the cap unit, and the cap unit has a second flat surface facing the first flat surface of the second lens unit.

7. The method of claim 5, wherein each of the base units has a step portion in the first through hole.

8. The method of claim 7, further comprising mounting an IR-cut filter in the first through hole on the step portion of each of the base units.

9. The method of claim 5, wherein a plurality of dicing lines are formed on the base preform, the first lens preform, the spacer preform, the second lens preform and the base preform.

10. The method of claim 5, further comprising applying a protecting film on the cap preform prior to the dicing step.

* * * * *